United States Patent [19]
Allen et al.

[11] 3,901,180
[45] Aug. 26, 1975

[54] APPARATUS FOR TRANSFER AND COATING OF BOTTLES

[75] Inventors: Fred E. Allen, Vineland; Joseph C. Flynn, Bridgeton; Walter Panas; Joseph S. Bonino, both of Millville; William Colgan, Cape May, all of N.J.

[73] Assignee: Wheaton Industries, Inc., Millville, N.J.

[22] Filed: Jan. 16, 1974

[21] Appl. No.: 433,768

[52] U.S. Cl. .......................... 118/2; 118/6; 118/7; 118/421; 118/423; 198/20 R; 214/1 BD
[51] Int. Cl.² ........................................ B05C 11/14
[58] Field of Search .......... 118/2, 7, 8, 6, 421, 423, 118/425, DIG. 5; 117/DIG. 6, 113, 114 R, 114 A, 114 B, 114 C, 94; 65/260; 214/1 BD, 147 T, 89; 198/20 R, 27, 179, 131

[56] References Cited
UNITED STATES PATENTS

| | | | |
|---|---|---|---|
| 2,997,018 | 8/1961 | McGraw, Jr. | 118/421 X |
| 3,097,961 | 7/1963 | Duperriez | 117/113 X |
| 3,185,131 | 5/1965 | Manning | 118/421 |
| 3,341,353 | 9/1967 | Johnson | 117/94 |
| 3,648,821 | 3/1972 | Rudolph et al. | 214/1 BD X |
| 3,734,765 | 5/1973 | Russell et al. | 118/423 X |
| 3,765,474 | 10/1973 | Burton | 214/1 BD X |

*Primary Examiner*—Morris Kaplan
*Attorney, Agent, or Firm*—Miller, Frailey & Prestia

[57] ABSTRACT

A thermoplastic coating is applied to hot glass bottles, such as those in a glass annealing lehr, by transferring the bottles to an overhead conveyor and, while the bottles are suspended therefrom, immersing them in a chamber or tank containing a fluidized bed of thermoplastic resin powder suitable for fluid bed coating. After the bottles have been coated in the fluid bed, they may pass through a further cooling chamber to facilitate their handling. Ultimately, the bottles are delivered to a product delivery station by the overhead conveyor. This conveyor may move in a continuous, i.e., non-intermittent manner, in which case the fluidized bed-containing chamber or tank would also be mounted for longitudinal motion in unison with the overhead conveyor while bottles are immersed therein and for reverse movement, after the bottles have been removed, to return to its starting position. Preferably, the overhead conveyor moves in an intermittent manner and the fluid bed chamber or tank is raised or the bottles lowered in a vertical direction, during the stop period of the intermittent motion of the overhead conveyor, to immerse bottles suspended from the overhead conveyor above the tank. Means for picking up hot bottles, from a lehr for example, and/or for transferring them to the overhead conveyor are also included.

19 Claims, 15 Drawing Figures

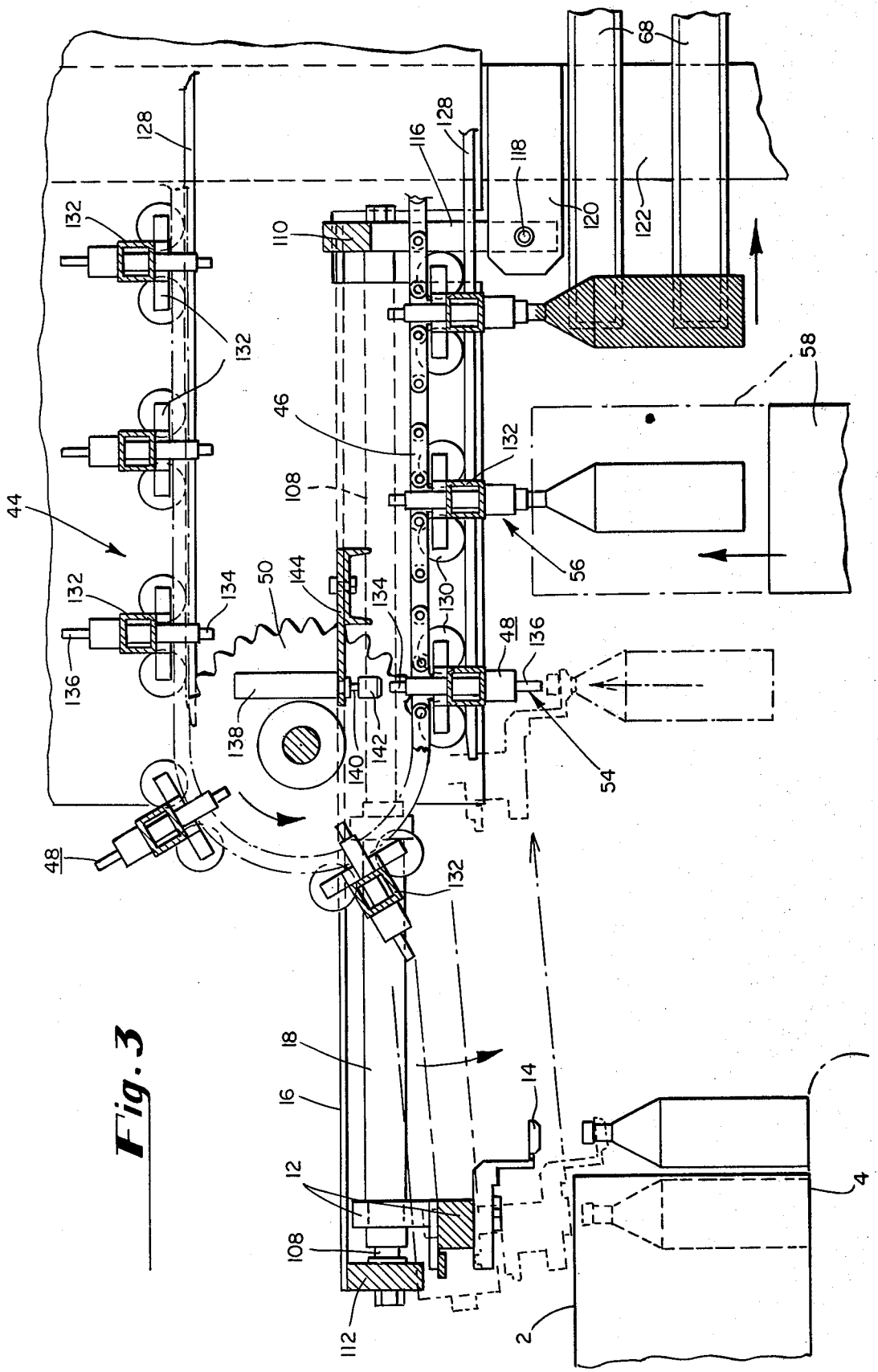

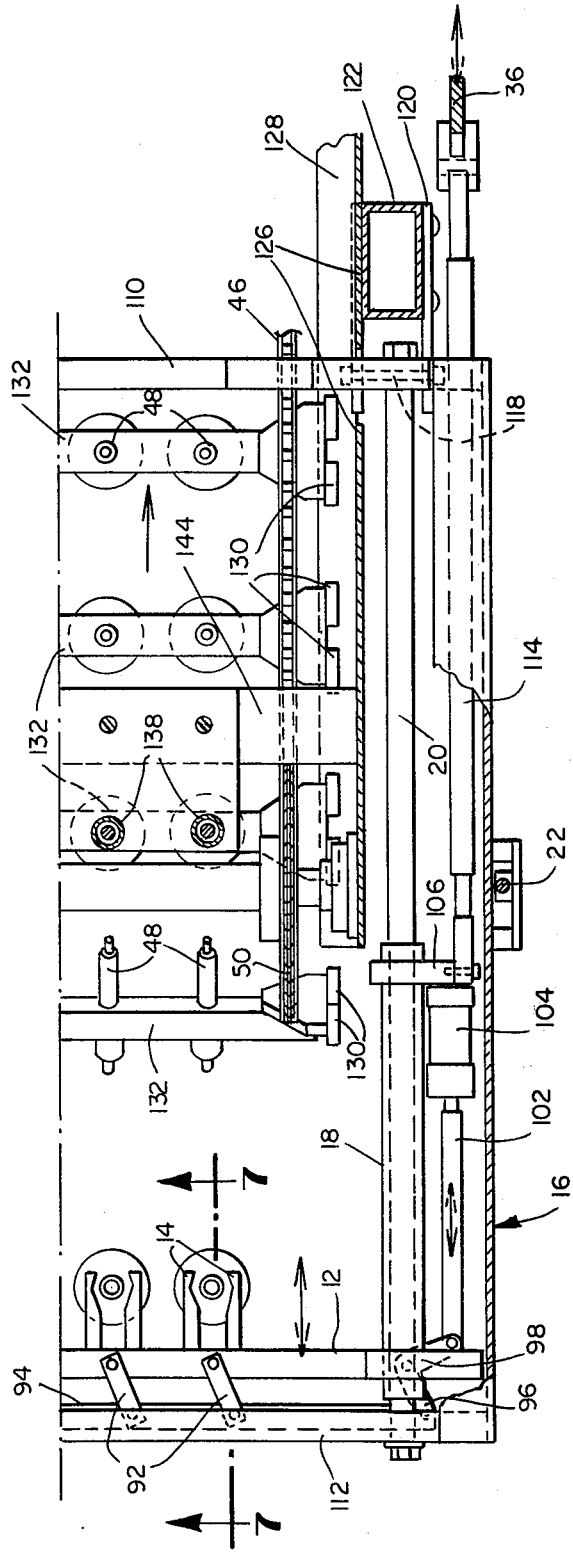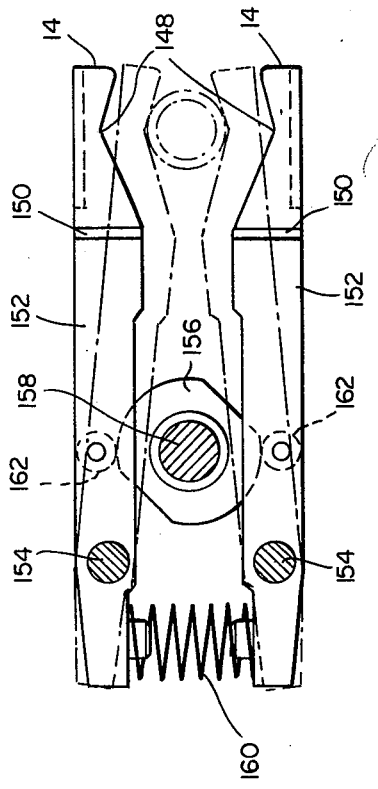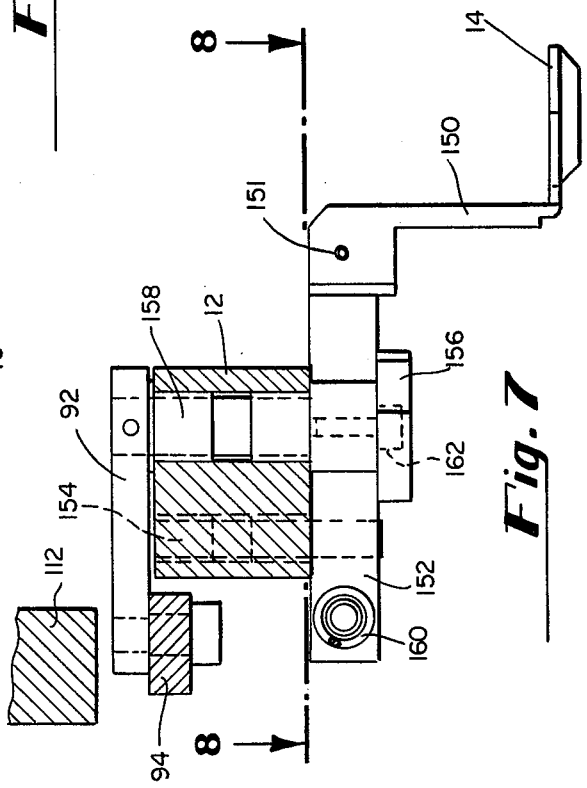

Fig. 9
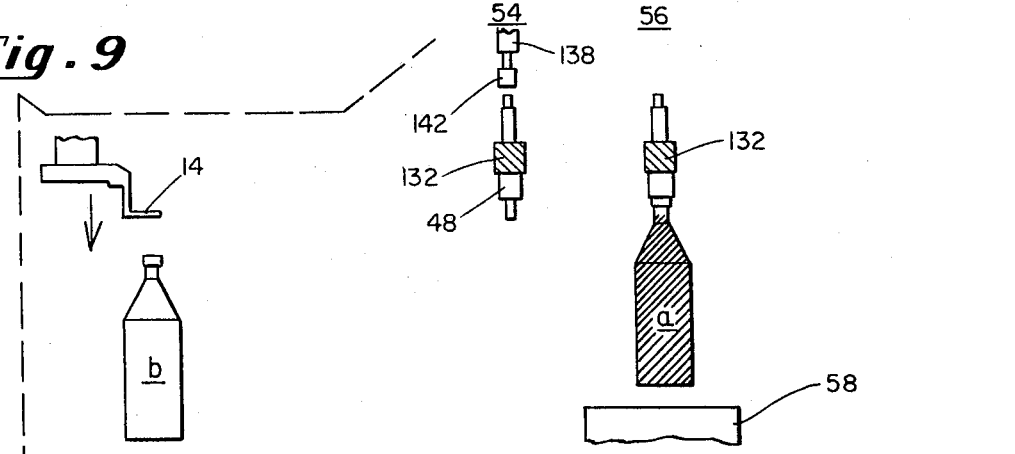
9A
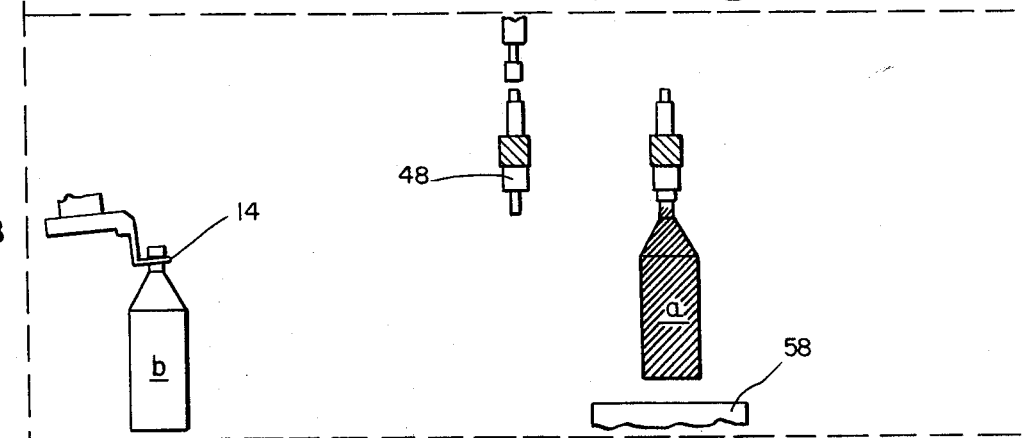
9B
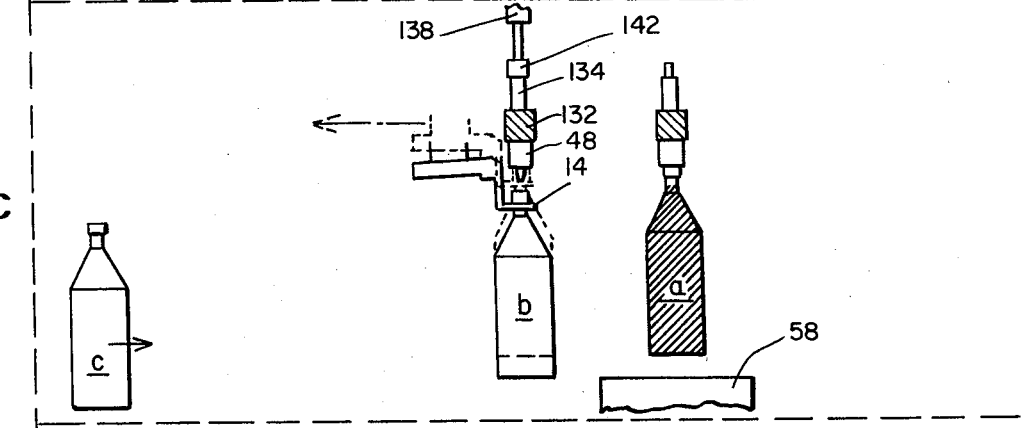
9C
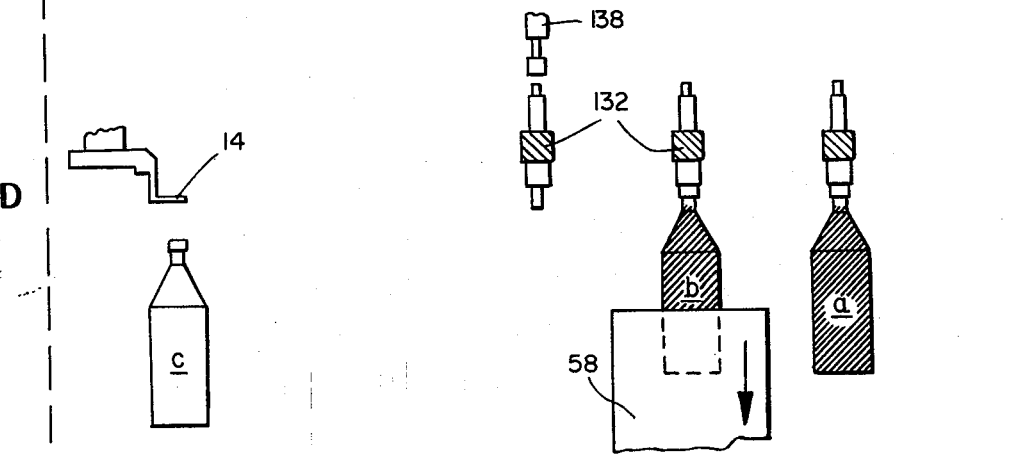
9D

APPARATUS FOR TRANSFER AND COATING OF BOTTLES

This invention pertains to an apparatus for continuously applying a thermoplastic coating to glass bottles, and particularly to such apparatus adapted to coat such bottles in a continuous in-line manner as they are produced or decorated.

In recent years, there has been increasing interest in the application of plastic coatings to glass bottles either to effect a change in the surface appearance or feel of the glass bottles, or to limit the tendency of the glass bottles to shatter upon breaking. The latter objective has become more prominent with the increasing emphasis on product safety.

Heretofore, the processes by which it has been proposed to apply plastic coatings to glass bottles have consisted generally of spraying, and particularly electrostatic spraying, and immersion in a liquid coating material. It is believed that known prior art processes for applying plastic coatings to glass bottles have not been generally acceptable either because of the cost involved or because of the quality of the coating attainable in high volume applications.

The technology of fluid bed coating is well known. It involves immersing an article in a bed of powder which is fluidized, or kept in a state of constant suspension, usually by the impingement of up-flowing gases from the bottom of the bed. Other means, such as an electrostatic field, may also be used to fluidize the bed. The powder consists of a thermoplastic resin in finely divided particulate form, and is commercially available as a product specifically designed and identified for use in fluid bed coating. The article to be coated is heated prior to immersion so that its surface temperature exceeds the melting point of the coating resin. Thus, when the article is immersed, its surface heat causes melting of the thermoplastic resin particles in contact therewith and the deposition thereon of a coating of the thermoplastic material, the thickness of which is controllable by the temperature of the part to be coated and the dwell time in the fluidized bed.

To the best of applicant's knowledge, continuous in-line fluidized bed coating processes have not been used to coat glass bottles prior to the present invention.

Having in mind the disadvantages of other prior art coating processes, it is the general objective of the present invention to provide a commercially feasible and industrially acceptable apparatus for applying a uniform, high quality, plastic coating to glass bottles on a high volume basis.

More particularly, it is an object to provide an apparatus for conveniently coating such bottles in the course of their manufacturing or decorating operation, in such a manner requiring less floor space, less energy and less manpower than processes heretofore known.

It is also a particular objective to provide an efficient and reliable apparatus for applying a plastic coating to glass bottles by a fluid bed process in the course of their manufacturing or decorating operation.

These and other objects are met by a process and apparatus wherein glass bottles, just following their manufacture, or the application thereto of ceramic decoration, are taken from an annealing or firing lehr while they are still hot, more specifically, while the surface temperature of the bottles is generally in the range of 400°–600°F., and preferably about 500°F., and transferred to an overhead conveyor from which they are suspended and by which they are conveyed over a tank or chamber (hereafter referred to as "tank") containing a fluidized bed of thermoplastic coating powder and ultimately to a product delivery station. The bottles may also pass through further heating and/or cooling section before reaching the product delivery station.

In the course of their travel on the overhead conveyor, they are immersed in the fluidized bed wherein, becuase of the temperature of the bottles, the resin powder in contact therewith is melted and deposited on the bottles is a fine coating. In this process, either the tank is raised to cause immersion and later lowered to permit the bottles to pass on while the tank returns to its starting position or the bottles are lowered from the conveyor into the tank. Similarly, if the conveyor is a continuous, non-intermittently operating conveyor, the tank must move longitudinally in unison with the conveyor while the bottles are immersed therein. Alternatively and preferably, the overhead conveyor moves intermittently and the tank is raised or the bottles lowered to immerse the bottles during the pause between intermittent movements of the conveyor. Whether the overhead conveyor operates intermittently or non-intermittently, it is still considered "continuous" in the sense that the overall process and apparatus functions in a continuous manner.

Various features of the apparatus of the present invention, all of which are combined in the preferred form of the apparatus of the present invention, include an overhead conveyor consisting of two endless sprocket chains suspended between horizontally displaced vertical sprocket wheels.

Also included is the apparatus for picking up, and very quickly transferring to the overhead conveyor, groups of bottles from an endless belt table conveyor such as that normally found in a conventional glass bottle annealing lehr or a ceramic decorating firing lehr. This pick up and transport mechanism includes a traverse bar with pairs of gripper fingers mounted thereon, each pair of fingers being separable to be lowered over the bottlenecks and then closed thereon. With the overhead conveyor aligned with the annealing lehr, and the traverse bar perpendicular to that alignment, the traverse bar is suspended from one end of movable frame members extending back along the overhead conveyor on each side thereof and pivotally connected at their opposite ends to vertical members in turn pivotally connected to fixed points with horizontally acting pistons and cylinders acting on the vertical members to effect the transfer movement of the traverse bar mounted on the frame members from the annealing or firing lehr to the point on the overhead conveyor where the bottles are transferred to the overhead conveyor.

At points intermediate to the two ends of each of these movable frame members, they are pivotally connected to vertical elevating members, the ends of which extend above the overhead conveyor and are pivotally attached to the ends of radial arms mounted on a common shaft in turn rotated through a predetermined arc by a driving radial member also mounted on the shaft and pivotally connected at its radial end to another piston and hydraulic cylinder. A stroke of this piston in one direction causes the traverse bar and gripper fingers mounted thereon to be moved downwardly over the bottles to be received from the hot lehr and movement in the opposite direction raises the bottles, after they have been transported longitudinally so that they are under the receiving point on the overhead conveyor, up onto chucks mounted on and suspended from the overhead conveyor.

These and various other features and aspects of this invention are described in greater detail in the complete description of this invention which follows. The invention may, therefore, be better understood by reference to the following complete description taken in conjunction with the appended claims and the drawings hereof, in which:

FIG. 3 is a sectional elevation of the apparatus shown in FIG. 1, taken in the plane 3—3 of FIG. 2;

FIG. 4 is a half sectional plan view of the apparatus shown in FIG. 1, in the plane 4—4 of FIG. 1;

FIG. 7 is an enlarged detail view in section, of the apparatus shown in FIG. 1, in the plane 7—7 of FIG. 4;

FIG. 8 is an enlarged detail plan view of one part of the apparatus shown in FIG. 1;

Figure 1:
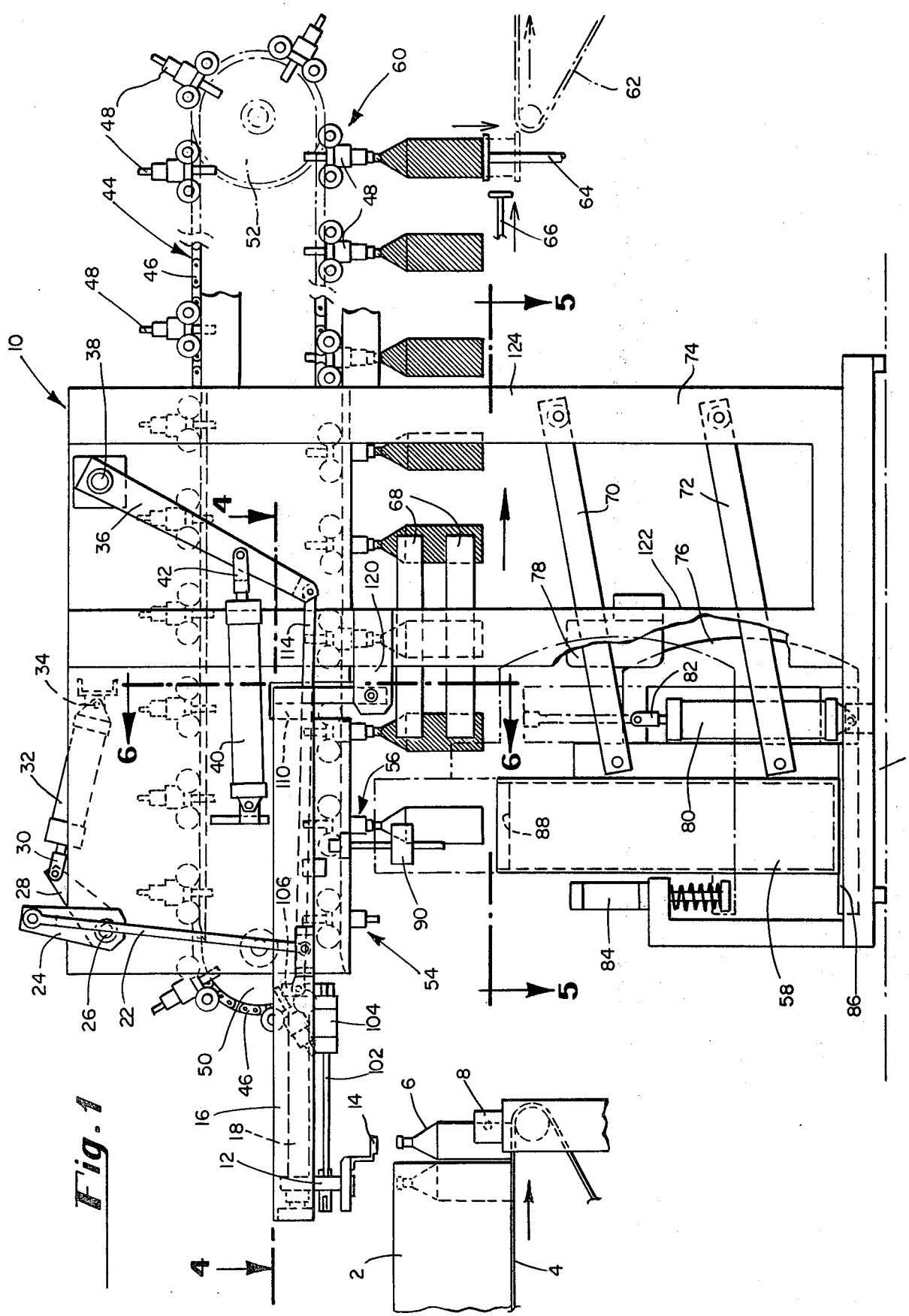
FIG. 1 is a side view of the preferred form of apparatus of the present invention.
Figure 10:
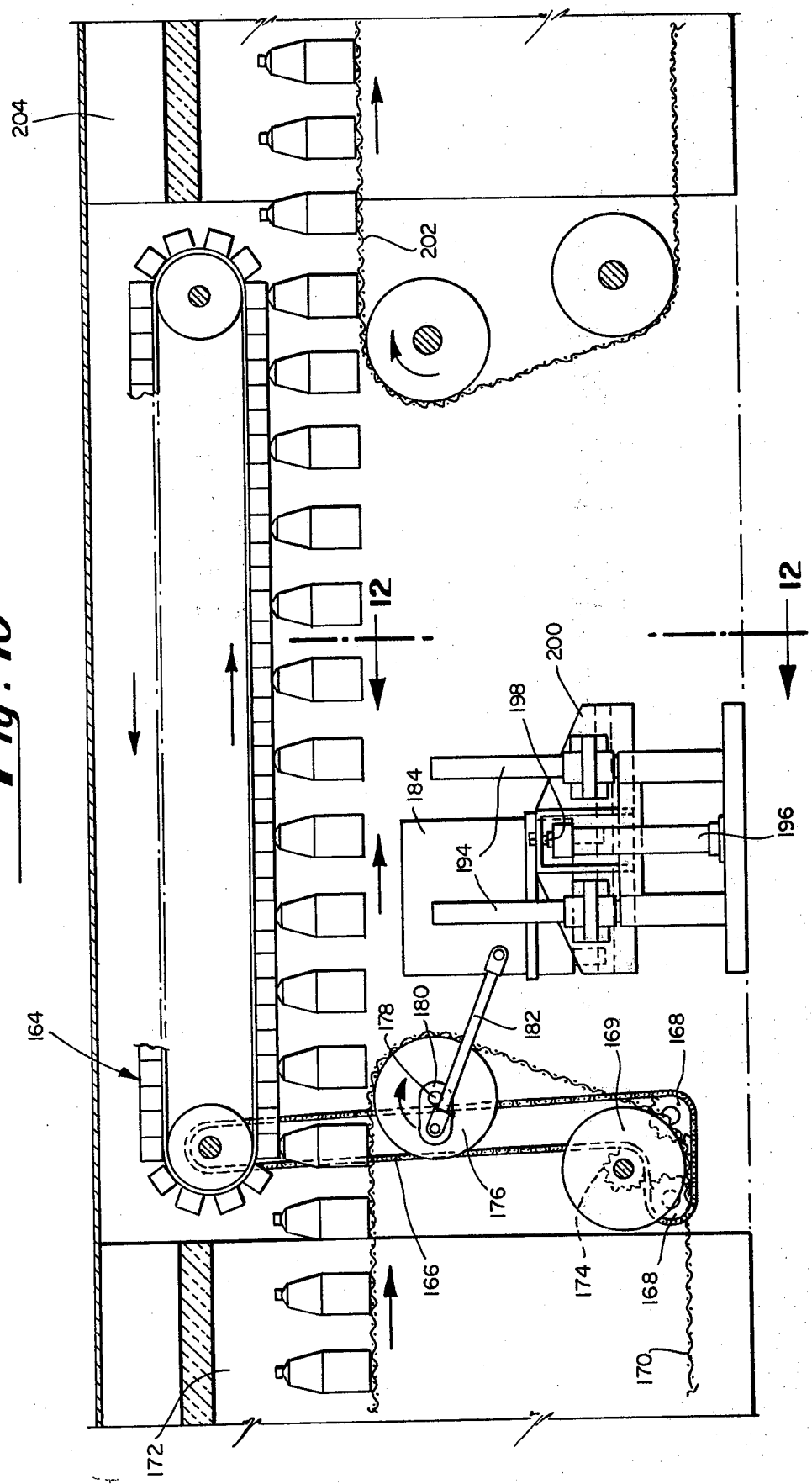
Figure 11:
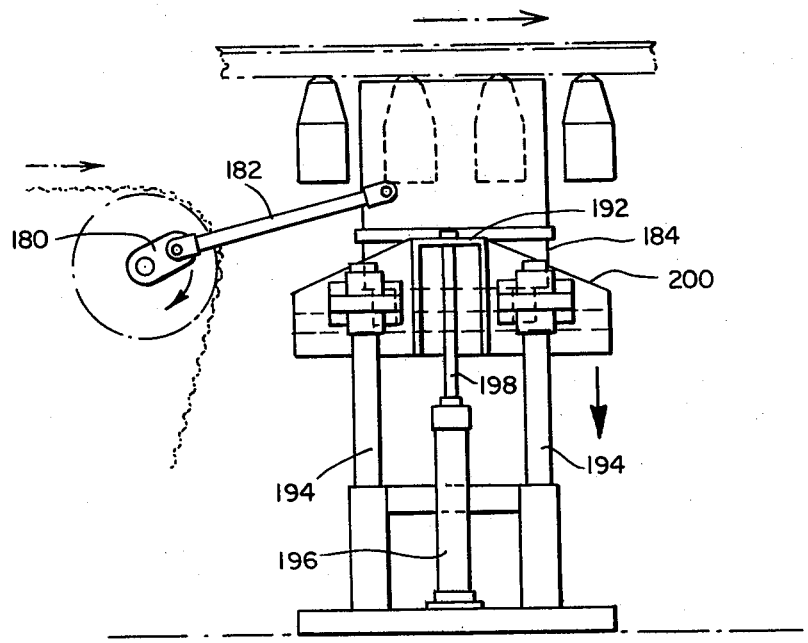
Figure 12:
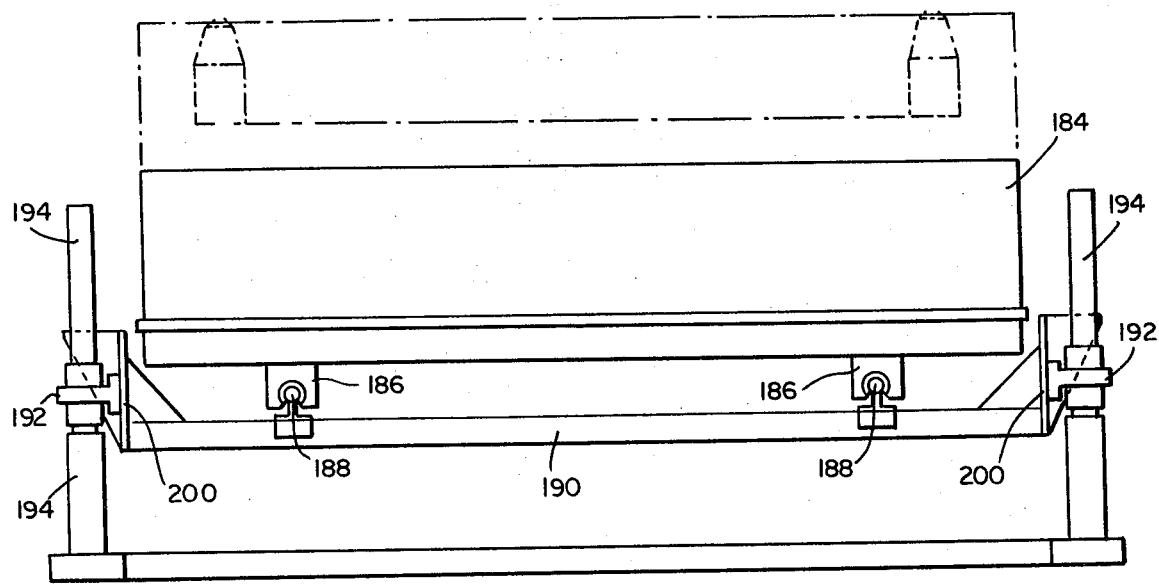

FIGS. 9a –9d, respectively, are sequential schematic views depicting the operation of the apparatus shown in FIG. 1;

FIG. 10 is a side view of a somewhat different apparatus for carrying out the process of the present invention;

FIG. 11 is a partial side view of the apparatus shown in FIG. 10, shown in a different stage of operation to depict the movement thereof; and FIG. 12 is a sectional elevation of the apparatus shown in FIG. 10, taken in the plane 12—12 of FIG. 10.

Figure 2:
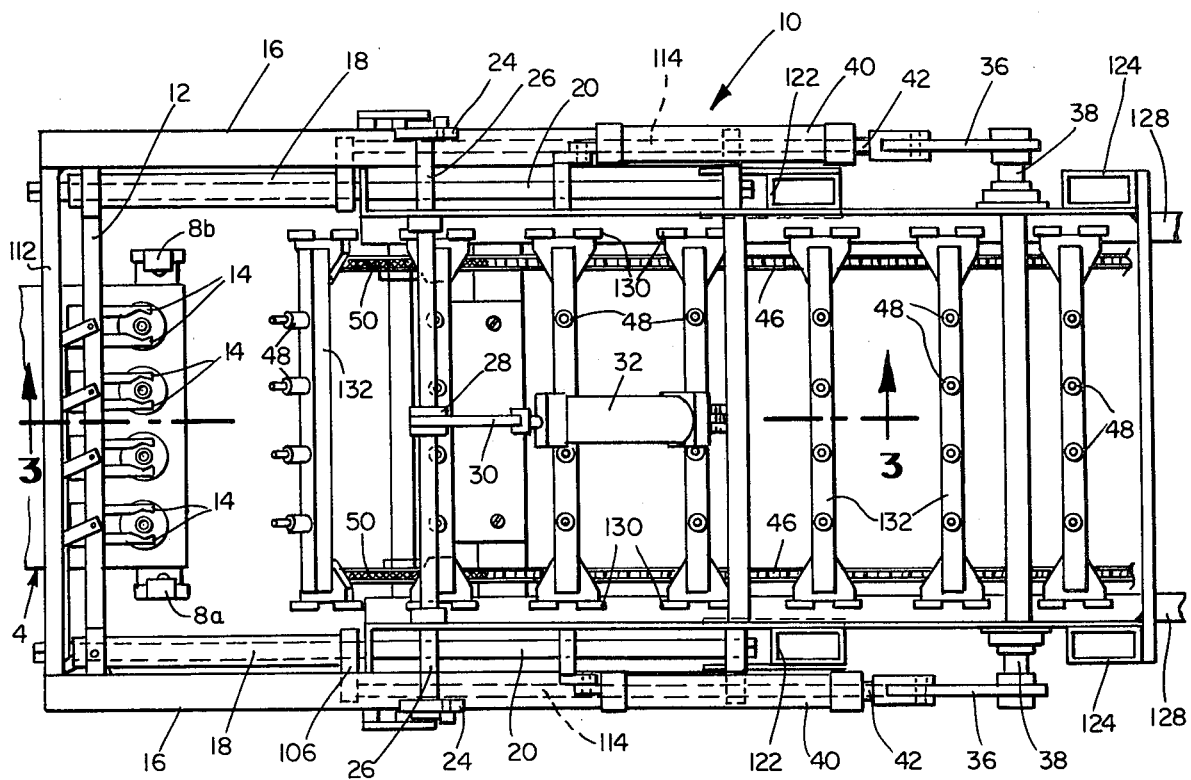
FIG. 2 is a plan view of the apparatus shown in FIG. 1.

Referring more specifically to FIGS. 1 and 2, there is shown, respectively, one side and the top of the end of a glass bottle annealing lehr 2 including an endless belt table conveyor 4 with hot bottles 6 (usually at 400°–600°F., preferably about 500°F.). At the end of lehr 2, hot bottles 6 pass through the path of a light source and photocell receiver combination 8 causing an output signal therefrom. Coating apparatus 10 is activated thereby. Coating apparatus 10 includes, generally, traverse bar 12 from which is suspended bottle gripping fingers 14; traverse bar 12 is in turn suspended between movable frame members or lateral arms 16 on either side of the machine, more specifically being attached to sleeves 18 slidingly engaged on shafts 20 which are in turn fastened to forward cross member 112 and rear cross member 110 (best seen in FIGS. 4 and 6). Lateral arms 16 are pivotally connected to elevating members 22 which are in turn pivotally connected to radial arms 4 fixedly mounted on shaft 26 to which is fixedly secured a second radial member 28 in turn pivotally connected to a piston rod 30 and hydraulic cylinder 32 pivotally mounted to a fixed point 34.

Through yoke 106 (best seen in FIG. 4) and longitudinally acting connecting member 114, sleeve 18 is pivotally connected to vertical members 36 in turn secured at their opposite ends to fixed pivots 38 and each acted on at a point intermediate its ends by a generally horizontally acting pivotally mounted cylinder 40 with piston and piston rod 42.

Also seen in FIGS. 1 and 2 is an overhead conveyor 44 including a pair of sprocket chains 46 (only one of which is seen in the side view of FIG. 1) and a plurality of bottle chucks 48 mounted thereon in an array at fixed intervals. Each sprocket chain 46 is guided in a generally vertical plane between horizontally displaced vertically oriented sprocket wheels 50 and 52.

Coating apparatus 10 also includes means, not shown, for indexing or causing the movement of sprocket chain 46 along its length, a distance equal to the intervals or fixed distances between bottle chucks 48 in the array thereof on sprocket chain 46. At the end of each such indexing movement, one set of bottle chucks 48 are disposed in a bottle receiving position 54 and the adjacent set of bottle chucks 48 is disposed in a coating position 56 over a fluidized bed coating tank 58.

As seen in FIG. 1, overhead conveyor 44 is adapted to be moved in a counter-clockwise direction. Associated with overhead conveyor 44 and adapted to receive coated bottles at the end thereof, upon release of bottles at a product delivery station 60, is a second endless belt table conveyor 62, vertically moveable platform 64 and pusher 66. After each indexing movement of conveyor 44, platform 64 is raised to receive bottles as they are released from chucks 48 by camming means as described more fully hereinafter. Platform 64 is then lowered and pusher 66 is activated to transfer bottles from platform 64 to conveyor 62. Wire brushes may also be positioned to remove any residual or fragmented glass or coating from chucks 48 after bottles have been removed therefrom at product delivery station 60.

Heaters, such as radiant heater 68 are provided at the sides of the apparatus to prevent undue loss of heat from the sides of bottles in the outside lanes after they have been coated and as they are conveyed away from the coating position 56.

Fluidized bed coating tank 58 is mounted for vertical movement to pivotally connected parallelogram guiding members 70 and 72, which are in turn pivotally connected to a fixed or static vertical support 74. Also connected to tank 58 is an extended member 76 having vertical planar surfaces associated with a braking device 78. A vertically oriented hydraulic cylinder 80 and associated piston with piston rod 82 is connected to member 76 to raise and lower tank 58. A coil spring shock absorber 84 is mounted to engage a horizontal extension 86 of tank 58 to arrest the upward movement thereof at the end of the vertical stroke of piston 82. A similar shock absorber, not shown, may be included below horizontal extension 86 or below tank 58 itself to dampen the shock upon tank 58 arriving at its down position.

Also shown in phantom in FIG. 1 is the position of tank 58 at its upper most position, wherein bottles suspended from chucks at coating position 56 on overhead conveyor 44 are immersed in a fluidized bed of coating powder contained in tank 58.

Tank 58 may also be raised and lowered mechanically rather than hydraulically. For example, a shaft may be turned to raise and lower a scissors-jack type tank lift. Such a mechanical elevating means is preferred for prolonged operation with a heavy fluidized bed.

Although not shown in FIG. 1, tank 58 includes means for supplying additional thermoplastic coating powder to maintain a sufficient level thereof in tank 58 and also includes pneumatic means at the bottom of tank 58 to provide a sufficient pressure and volume of upwardly flowing gas to keep the bed of coating powder in tank 58 in a fluidized condition. The additional or make-up powder is preferably introduced into the botton of the bed pneumatically so that it is in a presuspended condition. The upwardly flowing gas in the bed may, of course, be omitted if some other means, such as an electrostatic field, is used to fluidize the bed.

Additional or make-up powder may be added on a precomputed basis related to the usage rate of powder in apparatus 10 (based on number of bottles coated per unit time and weight of coating per bottle) or it may be automatically controlled in relation to the level of top surface 88 in tank 58. Alternatively, it may be controlled by providing an inner liner in tank 58 with the top lip thereof below the lip of tank 58 so that a constant overflow of thermoplastic coating powder is provided with the overflow around the inner surface of tank 58 being collected and returned to tank 58 in a recycle loop.

In the event some means is provided for maintaining a constant level of fluidized bed coating powder in tank 58, the upper movement of tank 58 may be controlled by adjusting the length of stroke of piston rod 82 with or without the combined adjustment of shock absorber 84. The automatic level control means or overflow level control will automatically compensate different usage rates as different numbers of bottles are coated.

Preferably, in the apparatus of this invention, surface level is not controlled and the upward movement of tank 58 is stopped in response to a signal that top surface 88 in tank 58 has reached a certain vertical position relative to that of chucks 48 in the coating position 56. This may be effected, for example, by a float means 90 providing an output signal indicative of the position of top surface 88 of the fluidized bed.

The output signal of float means 90 is then used to control the actuation of piston rod 82 to top the vertical movement thereof and to effect braking action, by braking device 78 upon member 76 attached to tank 58.

A better understanding of coating apparatus 10 may be had by reference to the plan view thereof in FIG. 2 wherein many of the same elements seen in FIG. 1 are shown as seen in plan view. Here, too, it will be seen that in the preferred form of the present invention the light source and receiver combination 8 consists of, for example, a light source 8a impinging upon a photocell receiver 8b adapted to provide an output signal in response to the interruption of the beam therebetween, such as by the arrival of bottles on endless belt table conveyor 4 at the position to be picked up therefrom by bottle gripping fingers 14 of the bottle pick up and transport mechanism of coating appratus 10.

For a better understanding, specifically, of the bottle pick up and transporting mechanism of coating apparatus 10 and of the mechanisms for the transfer of bottles therefrom to chucks 48 on overhead conveyor 44, reference is made to FIGS. 3 and 4.

Gripping fingers 14, it will be noticed, are pivotally mounted under traverse bar 12 to be actuated by pivoted lever members 92 which are also connected to finger actuating bar 94. At one side of the apparatus, finger actuating bar 94 is pivotally connected to a first radial extension 96 of pivotally mounted bell crank 98 in turn connected pivotally at a second radial extension to the piston rod 102 associated with a hydraulic cylinder 104 connected by yoke 106 to sleeve 18. Sleeve 18, on both sides of the machine, is slidingly mounted on shaft 20 which is fixedly mounted on a rear cross member 110. Sleeve 18 is also mounted at its forward end to forward cross member 112. Yoke 106 is pivotally connected to a longitudinally acting connecting member 114 which is pivotally connected to vertical member 36 for longitudinal actuation of the gripping finger 14 carriage, including gripping fingers 14, traverse bar 12, and forward cross member 112.

In order to permit this entire carriage to pivot in a vertical plane, shaft 20, on each side of the machine, is attached, such as by bolt means, to rear cross member 110, which is in turn fastened to vertical connecting member 116, vertically pivoted at pivot shaft 118 and secured at that point to a static member 120.

Static member 120 is attached to a first vertical frame member 122 which together with second vertical frame member 124 and like members on the opposite side of overhead conveyor 44 provides support for vertical plates 126 (as seen also in FIG. 6) on which is mounted horizontal tracks 128 upon which are supported rollers 130 associated with sprocket chain 46, thus providing the paths and the support for the overhead conveyor 44 of the apparatus. Also associated with each set of rollers 130 at fixed intervals along sprocket chain 46 and suspended between the sprocket chains on each side of overhead conveyor 44 are chuck mounting conveyor bars 132.

Mounted on each of the chuck mounting conveyor bars 132 is a plurality of chucks 48, the traverse positions of which correspond to the positions of pairs of gripping fingers 14, chucks 48 thus being adapted to receive bottles from gripping fingers 14.

In the preferred embodiment of the present invention, chucks 48 each include an inwardly directed (upwardly directed when the chucks are on the lower horizontal or bottle receiving portion of the conveyor) plunger 134 and outwardly directed prongs 136, each of the chucks including a plurality, normally 3, of such prongs urged away from one another, such as by a spring loaded camming device within chuck 48. With chuck 48 in the bottle receiving position 54 of overhead conveyor 44, downward actuation of plunger 134 counteracts the prong biasing means in chuck 48 causing the prongs to be contracted inward or toward one another so that a bottle delivered by gripping fingers 14 under chuck 48 and then raised vertically has its neck portion surrounding prongs 136 such that upon release of plunger 134 prongs 136 urged outwardly thereby grip the bottle from which thereafter the bottle remains suspended until release at the opposite end of conveyor 44 by a similar plunger actuation mechanism.

Also referring specifically to the illustrated form of the present invention, plunger 134 is actuated by a plurality of hydraulic cylinders 138 associated with piston rods 140 and plunger actuating cams 142 all suspended from a cross member 144 supported on side plates 126, the hydraulic cylinders 138 and associated devices each being disposed, respectively, above a chuck 48 mounted on mounting bars 132 in the bottle receiving position 54 of apparatus 44. (A similar mechanism, not shown, is located at product delivery station 60.) Although not shown, upwardly acting stress members or hydraulic cylinders may act on horizontal tracks 128 at the bottle receiving position 54 and the product delivery station 60 to counteract the downward stress from the plunger actuating cams 142 at there positions.

Preferably, the plungers 134 in each set of chucks are activated by a single traverse activating bar, operated by a single hydraulic position, pressing downwardly to cause the contraction of the prongs in each of the chucks 48 toward one another at the bottle receiving and product delivery stations.

Figure 6:
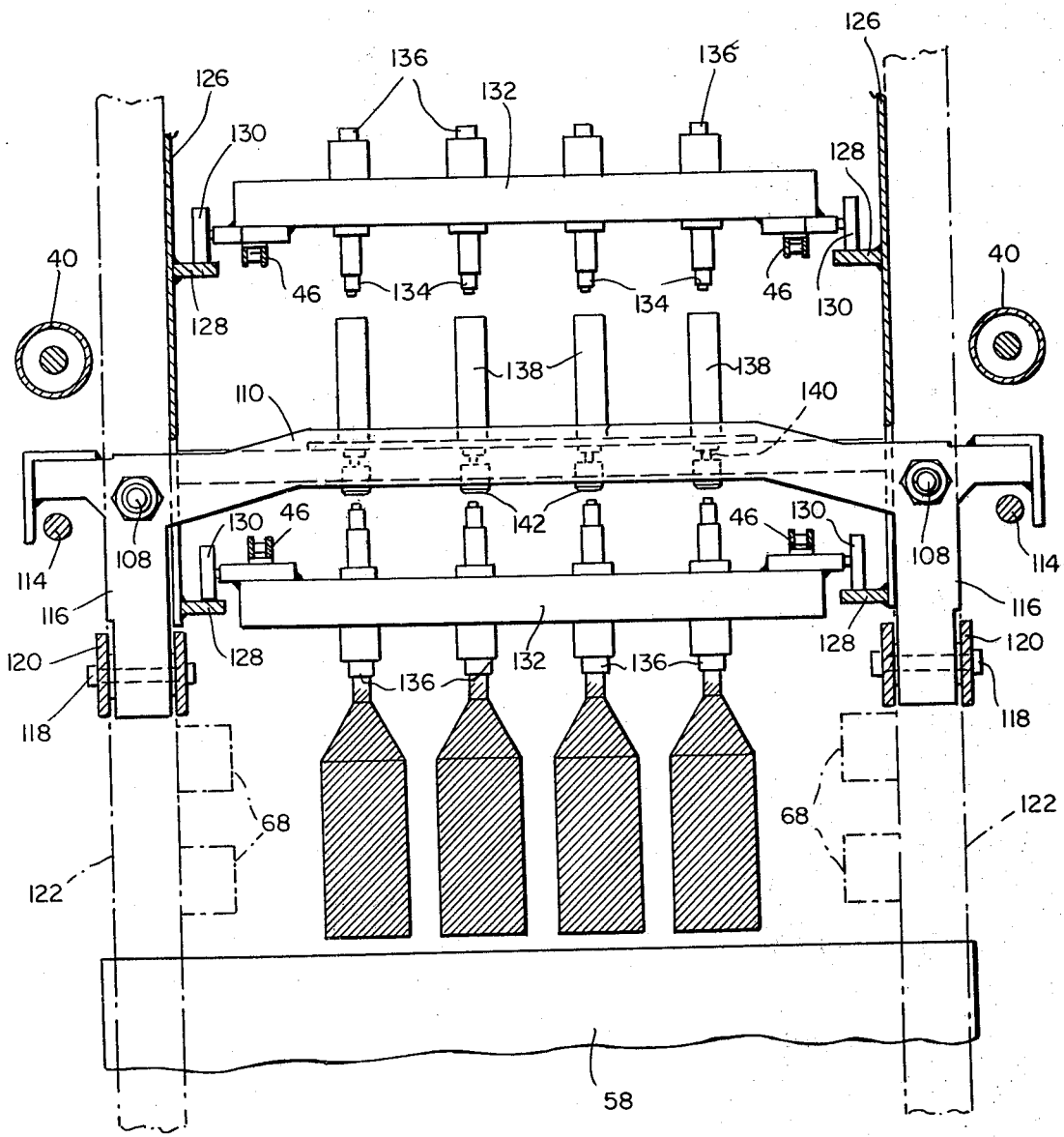
FIG. 6 is a sectional elevation view of the apparatus shown in FIG. 1, in the plane 6—6 of FIG. 1.

Reference should be made to FIG. 6, which is a sectional elevation view in plane 6—6 of FIG. 1, for a further illustration of the details described with respect to FIGS. 3 and 4.

Figure 5:
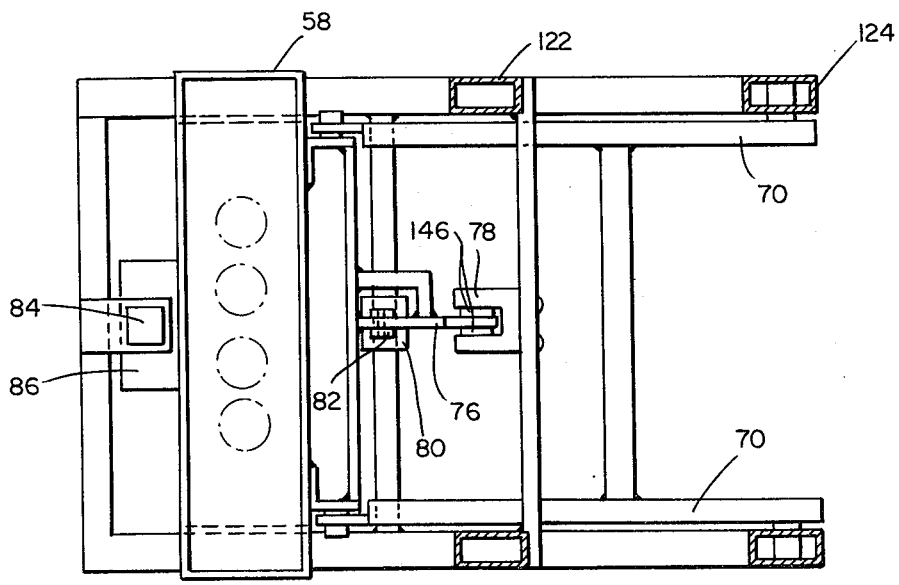
FIG. 5 is a partial sectional plan view of the apparatus shown in FIG. 1, in the plane 5—5 of FIG. 1.

FIG. 5, taken together with FIG. 1, illustrates the support and connecting members associated with tank 58, in the illustrated embodiment of the present invention. More specifically, it is seen that tank 58 is pivotally connected to guiding members 70 and 72, in turn pivotally connected to vertical frame members 124. Further, tank 58 includes an attached member 76 with vertical planar surfaces associated with a braking device 78, including more specifically friction surfaces 146 which are actuated inwardly to arrest vertical movement of tank 58.

Turning now to FIGS. 7 and 8, there is shown various details of gripping fingers 14 and the actuating mechanism connected therewith in this feature of the present invention. It will be noted that gripping fingers 14 include opposed tip surfaces with indentations 148 for receiving and gripping bottlenecks. The tips of gripping fingers 14 are also connected through vertical suspending portions 150 in turn pivotally connected by pin 151 with horizontal rear portions 152 pivotally mounted on traverse bar 12 at pivot shafts 154, each pair of gripping fingers 14 being separated by a cam member 156 engaging cam followers 162 on fingers 14. Cam member 156 is mounted on shaft 158 which is connected to lever operators 92 pivotally connected to finger actuating bar 94. Spring 160 acting on rear portions 152 of gripping fingers 114 causes the tips thereof to be biased toward one another. The pivotal connection at pin 151 is important to permit gripper fingers 14 to pivot upwardly and away from any interfering or out-of-position bottle necks which might otherwise stop or foul the gripper lowering and gripping operation or damage the gripper fingers and/or associated mechanisms.

Operation of the apparatus shown in FIGS. 1-8 may be better understood by reference to the sequential schematic illustration of FIGS. 9A through 9D. In FIG. 9A, the various components of the apparatus are in the position shown in FIG. 1.

The cycle begins when photocell and beam source combination 8 signal the presence of bottle b at the pickup position. (Bottle a has been coated during the previous cycle as shown in FIG. 9A.) In response, gripping fingers 14 are lowered over bottle b (by actuation of piston rod 30) whereupon cylinder 104 and piston 102 are actuated to close finger 14 to grip bottle b as shown in FIG. 9B. Actuation of hydraulic cylinder 40 and associated piston rod 42 then acts through connecting member 114, yoke 106 and sleeve 18 to transfer traverse bar 12 longitudinally back toward overhead conveyor 44. With bottle b thus being transported to bottle receiving position 54 of overhead conveyor 44, piston rod 30 is again actuated, this time in a reverse direction, to raise the bottle gripping fingers 14, suspended from traverse bar 12 so that prongs 136 are received in the neck of bottle b.

FIG. 9C illustrates the relative positions of these elements as bottle b approaches chuck 48. Prior to thus raising gripping fingers 14 so that bottle b is received on the prongs 136 of chuck 48, plunger actuator 134 is functioned by hydraulic cylinder 138 to press downward on plunger 134. After bottle b has been received on prongs 136, of chuck 48, plunger actuating cylinders 138 are deactivated so that prongs 136 expand and grip bottle b. Reverse actuation of cylinder 104 and associated piston rod 102 then turn cams 156 and opens gripping fingers 14 permitting reverse actuation of cylinder 40 and associated piston rod 40 to return traverse bar 12. bar 12 and its associated bottle gripping and transport mechanisms to the starting position shown in FIG. 9A. At this time, overhead conveyor 44 is indexed the distance of the intervals between adjacent sets of chucks 48 on sprocket chain 46 thereby conveying bottle b to coating position 56 as shown in FIG. 9D. Immediately upon completion of index, the fluidized bed tank 58 is raised immersing bottle b. A timer can be used to control the period of dwell for complete immersion of bottle b. Upon completion of this time, hydraulic cylinder 80 and associated piston rod 82 are again actuated, this time to lower tank 58 leaving a coating of melted thermoplastic coating powder from the fluidized bed in tank 58 on bottle b. It can be readily seen that, depending on the machine cycle, the bottle pickup and transfer function can overlap the bottle coating function as shown in FIG. 9, where bottle c is being picked up by fingers 14 while the fluidized bed tank 58 is being lowered. The cycle is established in this manner so that there is minimum delay in the time from when the bottle leaves the lehr 2 and enters the fluidized bed tank 58.

Another form of the apparatus for the practice of the present invention is seen in FIGS. 10-12. Referring specifically to FIG. 10, there is shown, schematically, an overhead conveyor 164 continuously driven by a first sprocket chain 166 which passes over idler sprockets 168 and is in turn driven by sprocket wheel 174 which is mounted on a common shaft drive wheel 169 of an endless belt table conveyor 170 carrying glass bottles through a heated space 172, such as that of an annealing or ceramic decoration firing lehr. Idler wheel 176 on shaft 178 drives a crank member 180 pivotally connected to a tank longitudinal transfer member 182.

As better seen in FIGS. 11 and 12, tank 184 containing a fluidized bed of thermoplastic coating powder is mounted for longitudinal movement on guide members 186 and horizontally suspended tracks 188 mounted on a suspended bed plate 190 in turn connected through side plates 200 to yokes 192 riding on vertical guide members 194. A vertically mounted hydraulic cylinder 196 and associated piston rod 198 adapted to raise the side plates 200 of suspended bed plate 190 and thereby to raise and lower fluidized bed coating tank 184.

A second endless belt table conveyor 202 is disposed to receive bottles from overhead conveyor 164 after they have been coated. Not shown in FIGS. 10-12, are means for actuating chucks mounted on continuous overhead conveyor 164 so that bottles from lehr space 172 are gripped and suspended from these chucks in order that the bottles disposed on the endless belt table conveyor 170 are transferred to the overhead conveyor 164 and later are reversely actuated to release the bottles and permit them to be further transported into, for example, a further cooling tunnel 204.

In the operation of the apparatus shown in FIGS. 10–12, it will be apparent that a common driving means is used to move endless belt table conveyor 170 in unison with overhead conveyor 164 and to cause tank 184 to be reciprocably moved in a longitudinal direction under overhead conveyor 164, partially in unison therewith and partially in reverse movement thereto. By predetermined sequential timing of the actuation of hydraulic cylinder 196 and associated piston rod 198, tank 184 is caused to be raised at the beginning of its longitudinal movement in unison with overhead conveyor 164 so as to immerse bottles suspended in the coating position from overhead conveyor 164 in a fluidized bed of thermoplastic coating powder contained in tank 184. Similarly, by predetermined sequential timing, hydraulic cylinder 196 and associated piston rod 198 are reverse actuated at the end of a longitudinal stroke of connecting member 182 (or prior thereto if less dwell time is desired) so as to lower tank 184 away from the bottles suspended from overhead conveyor 164 in order to permit the reverse longitudinal movement of tank 184 back to its starting position. The cycle is then continuously repeated, with bottles being conveyed in continuous, non-intermittent fashion on overhead conveyor 164 after they have been transferred from table conveyor 170 and with tank 184 being raised, moved in unison with a number of bottles on overhead conveyor 164 and then lowered away from the bottles to be returned to the initial starting position and thereafter to be raised to immerse the next group of bottles.

From the foregoing description, it will be evident that the present invention encompasses numerous variations and embodiments. Therefore, while this invention has been described with respect to specific embodiments, it should be understood that the invention is not limited thereto. Numerous variations and modifications may be made, by those skilled in the art, in the invention as described without departing from the true spirit and scope of this invention. The appended claims are accordingly to be construed to encompass all such equivalent variations and modifications.

It should be understood also that the process and apparatus of the present invention may be operated with any of a variety of commercially available finely divided thermoplastic coating powders suitable for fluidized bed coating. These powders may consist, for example of a resin selected from the group consisting of polyvinyl chloride, polyethylene, polystyrene, polypropylene, polycarbonate, polybutylene, polyurethane, polybutadiene, polyacrylonitrile, polymethylmethacrylate, polyesters, vinyl polyesters, nylon, fluoronated polyethylene, ionomers (metal substituted polyethylene), epoxy, epoxy-novolac, polyvinyls, cellulosic compounds, cellulose acetate butyrate, ethyl vinyl acetate, and copolymers and mixtures thereof.

As an example of typical process conditions using an apparatus of the type shown in FIGS. 1–9, with a fluidized bed height of 24 inches of PVC powder with an average particle size of 40 microns, an air pressure of 3½ pounds per square inch, gauge, must be maintained at the bottom of tank 58. Bottles at an approximate temperature of 500°F. are then immersed in tank 58 for about 2 seconds to produce a 10 mil coating. Different pressures and different immersion times may, of course, be required for different powders or different bottles or bottle temperatures.

We claim:

1. Apparatus for applying a thermoplastic coating to glass bottles and adapted to received hot bottles, from a horizontal endless-belt table conveyor, said apparatus consisting of:
   a. sensing means for indicating the presence of bottles at a pick-up position on said horizontal endless-belt table conveyor and for providing an output signal in response thereto,
   b. pick-up means responsive to said signal for picking up said bottles and transporting them to a downwardly extended first set of chucks mounted on an endless overhead conveyor at a first position thereof,
   c. said first set of chucks and said overhead conveyor being adapted to receive said bottles at said first position on said conveyor, from said pick-up means, to grip said bottles upon the receipt thereof and to transport said bottles in a horizontal path from said first conveyor position.
   d. said first set of chucks being part of an array on said overhead conveyor, said array consisting of a plurality of identical sets of chucks, said sets being positioned at fixed intervals along said conveyor,
   e. overhead conveyor drive means for moving said overhead conveyor a distance along its length corresponding to said fixed intervals between sets of chucks thereon, further including conveyor actuation means for initiating said drive means following placement of said bottles on said first set of chucks,
   f. an open top tank adapted to receive a bed of fluid bed coating powder and means for fluidizing a bed of powder contained therein, said tank being positioned directly below a second set of chucks, adjacent said first set of chucks on said overhead conveyor in the direction of movement of said overhead conveyor, said tank being sufficiently large to encompass the projected area of said second set of chucks,
   g. means for raising said tank following said overhead conveyor movement and for stopping said upward movement at a point wherein the surface of a fluidized powder bed in said tank is at a predetermined vertical position relative to said second set of chucks, holding said tank in said raised position for a period of time, and then lowering said tank to its starting position, and
   h. resetting means for thereafter permitting said sensing means to indicate the presence of further bottles at said pick-up position and to provide an output signal responsive thereto.

2. Apparatus, as recited in claim 1, wherein said sensing means comprises a light beam source, a photocell, sensitive to said light beam from said source, which provides an output signal in response to the impingement of said light beam thereon, said source and said photocell being disposed so that the path of said beam from said source to said photocell traverses a space occupied by bottles at said pick-up position.

3. Apparatus, as recited in claim 1, wherein said pick-up means comprises a plurality of pairs of fingers, the tips of each pair being biased toward each other, the inner surfaces of said fingers having indentations to facilitate the gripping of a bottle neck therein, said pick-up means further including means to separate said fingers, in opposition to said biasing means, and lowering means to lower said separated fingers in each of said pairs over a bottle at said pick-up position and then permitting said biasing means to cause said fingers to close toward one another and thereby to grip said bottle.

4. Apparatus, as recited in claim 3, wherein said fingers in each of said pairs of fingers are horizontally disposed, the tips of said fingers being spring-biased toward one another, further including a pivotally mounted cam between each such pair of fingers, and means for rotating said cam and thereby separating said tips of said fingers.

5. Apparatus, as recited in claim 4, wherein the tips of said fingers extend horizontally from vertical suspending members in turn connected to actuating portions of said fingers, said biasing means and said cam acting on said actuating portions, said cams being mounted on vertical shafts in turn connected to horizontally disposed lever members, an end of each such lever member being pivotally connected to a transverse finger actuating bar with means for moving said bar back and forth along its length to open and close said finger tips.

6. Apparatus, as recited in claim 1, wherein said overhead conveyor consists of two parallel endless sprocket chains, each suspended between at least two vertical sprocket wheels horizontally displaced from one another, with chuck bars mounted transversely of said chains connected to elements thereof and suspended therebetween, said chucks being suspended from said chuck bars.

7. Apparatus, as recited in claim 1, wherein each chuck in said first set of chucks consists of at least three downwardly extended prongs all mutually urged away from one another and means, actuable by downward pressure on a plunger operator on top of said chuck, for drawing said chuck prongs together, further including piston means for exerting downward pressure on said plunger prior to the pick-up and delivery of a bottle thereto, said transporting means causing said bottle to be placed with said prongs extending into the neck thereof, said piston means being actuated to relieve said pressure after the delivering of said bottle thereto.

8. Apparatus, as recited in claim 1, wherein said overhead conveyor, is aligned with said table conveyor and said bottle pick-up and transporting means consists of a plurality of bottle pick-up fingers mounted on a bar transverse of the paths of said bottles on said conveyors, said transverse bar being suspended between the first ends of a pair of transport arms extended along the sides of said overhead conveyor toward said pick-up position on said table conveyor, said arms being pivotally connected near their ends opposite said first ends to generally vertical members in turn pivotally connected at their opposite ends to fixed points, said vertical members being acted on at a point intermediate their ends by horizontally acting first piston rods and associated hydraulic cylinders pivotally secured to fixed points, the travel distance of said first piston rods and the relative dimensions and spacing of connection points of said first piston rods, vertical members and arms being such that the strokes of said first pistons cause said transverse bar to travel the distance between said pick-up position and said first set of chucks, each of said arms further being pivotally connected at a point intermediate its ends to a generally vertically disposed elevating member, said elevating member extending above said overhead conveyor and being pivotally connected to the outer end of a driving radial member, said driving radial members on the two sides of the apparatus being fixedly mounted on a common shaft extending across said machine, said shaft including a fixedly attached driven radial member, the outer end of which is pivotally connected to a second piston driving rod and associated hydraulic cylinder pivotally attached to a fixed point, the disposition of said radial arms being such that actuation of such second piston driving rod is transposed into substantially vertical movement of said elevating members.

9. Apparatus, as recited in claim 8, wherein the angle between said second piston driving rod and said driven radial member near at least one of the limits of movements of said member is substantially non-perpendicular.

10. Apparatus, as recited in claim 8, wherein along one of said arms is disposed a third piston arm and hydraulic cylinder for actuating same, said piston arm being pivotally connected to a first radial extension of a gripper finger actuating member, said finger actuating member being pivoted at a fixed point adjacent said transverse bar and further including a second radial extension generally perpendicular to said first extension, said second extension being pivotally connected to a gripper finger operator, said operator in turn being parallel to said transverse bar and guided and adapted to move along its length upon actuation of said third piston rod, said gripper finger operator further being pivotally connected to a plurality of lever members, each fixedly connected at its opposite end to a vertical shaft, each of said shafts in turn being fixedly connected to cam members disposed between a pair of opposed bottle finger grippers, said finger grippers being pivotally mounted on vertical shafts mounted on said transverse bar, each pair of finger grippers being urged toward one another in opposition to the separating function of said cams, said cams being shaped such that each pair of finger grippers are opened and closed by the traverse motion of said operator member.

11. Apparatus, as recited in claim 1, wherein said tank is pivotally connected at horizontally spaced positions to two sets of parallelogram guiding members, each set comprising a pair of parallel members pivotally attached, at one of their ends, to the tank at vertically spaced positions and pivotally attached, at the other of their ends to static vertical members.

12. Apparatus, as recited in claim 11, wherein a braking member attached to said tank includes vertical planar surfaces, further including fixedly mounted friction brake having friction surfaces opposing said planar surfaces and normally slightly spaced therefrom with means to cause said friction surfaces to engage said planar surfaces to stop vertical movement of said tank precisely at a particular vertical position.

13. Apparatus, as recited in claim 12, further including float means adapted to sense the upper surface of a fluidized bed in said tank at a predetermined vertical position relative to said second set of chucks and to provide an output braking signal responsive thereto, the upward vertical movement of said tank being stopped in response to said braking signal.

14. Apparatus, as recited in claim 11, further including means for maintaining a constant level of said bed in said tank and for stopping said upward vertical movement of said tank at a predetermined vertical position of said level.

15. Apparatus, as recited in claim 7, wherein said overhead conveyor consists of two parallel endless sprocket chains, each suspended between at least two vertical sprocket wheels horizontally displaced from one another, with chuck bars mounted traversely of said chains connected to elements thereof and suspended therebetween, said chucks being suspended from said chuck bars.

16. Apparatus, as recited in claim 10, wherein each chuck in said first set of chucks consists of at least three downwardly extended prongs all mutually urged away from one another and means, actuable by downward pressure on a plunger operator on top of said chuck, for drawing said chuck prongs together, further including piston means for exerting downward pressure on said plunger prior to the pick-up and delivery of a bottle thereto, said transporting means causing said bottle to be placed with said prongs extending into the neck thereof, said piston means being actuated to relieve said pressure after the delivering of said bottle thereto, and said overhead conveyor consists of two parallel endless sprocket chains, each suspended between at least two vertical sprocket wheels horizontally displaced from one another, with chuck bars mounted traversely of said chains connected to elements thereof and suspended therebetween, said chucks being suspended from said chuck bars.

17. Apparatus, as recited in claim 16, wherein said tank is pivotally connected at horizontally spaced positions to two sets of parallelogram guiding members, each set comprising a pair of parallel members pivotally attached, at one of their ends, to the tank at vertically spaced positions and pivotally attached, at the other of their ends to static vertical members, and wherein a mechanical means is provided for the raising and lowering thereof, and further including a float means adapted to sense the upper surface of a fluidized bed in said tank at a predetermined vertical position relative to said second set of chucks and to provide an output braking signal responseive thereto, the upward vertical movement of said tank being stopped in response to said braking signal, and wherein said upward vertical movement is stopped by inactivating said mechanical raising means and by activation of a friction brake having friction surfaces in engagement with vertical planar surfaces of a member attached to said tank.

18. Apparatus, as recited in claim 3, wherein said pairs of fingers are each suspended from a pivotal connection which permit each of said pairs of fingers to swing upwardly upon contact with a bottle during the downward movement thereof.

19. Apparatus, as recited in claim 5, wherein said vertical suspending members are pivotally connected to said finger actuating portions in a manner permitting said pairs of fingers to be rotated upwardly and away from said bottles on said table conveyor upon contact therewith during downward movement thereof.

* * * * *

UNITED STATES PATENT OFFICE
CERTIFICATE OF CORRECTION

PATENT NO. : 3,901,180

DATED : August 26, 1975

INVENTOR(S) : Fred E. Allen; Joseph C. Flynn, Walter Panas, Joseph S. Bonino, William Colgan.

It is certified that error appears in the above-identified patent and that said Letters Patent are hereby corrected as shown below:

Col. 3, line 57, change "4" to ---24---.

Col. 5, line 39, change "top" to ---stop---.

Signed and Sealed this seventeenth Day of February 1976

[SEAL]

Attest:

RUTH C. MASON
*Attesting Officer*

C. MARSHALL DANN
*Commissioner of Patents and Trademarks*